United States Patent
Endo et al.

(10) Patent No.: US 9,624,394 B2
(45) Date of Patent: Apr. 18, 2017

(54) INKJET PRINTING PROCESS AND NON-AQUEOUS INK SET

(71) Applicant: RISO KAGAKU CORPORATION, Tokyo (JP)

(72) Inventors: Toshihiro Endo, Ibaraki (JP);
Shinichiro Shimura, Ibaraki (JP);
Naoyuki Torita, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 135 days.

(21) Appl. No.: 14/574,683

(22) Filed: Dec. 18, 2014

(65) Prior Publication Data

US 2015/0184012 A1    Jul. 2, 2015

(30) Foreign Application Priority Data

Dec. 27, 2013 (JP) .................. 2013-272457

(51) Int. Cl.

| | | |
|---|---|---|
| C09D 11/10 | (2014.01) | |
| C09D 11/36 | (2014.01) | |
| C09D 11/322 | (2014.01) | |
| C09D 11/324 | (2014.01) | |
| C09D 179/02 | (2006.01) | |
| C09D 133/10 | (2006.01) | |
| C08K 3/04 | (2006.01) | |
| C08K 5/23 | (2006.01) | |
| C08K 5/3417 | (2006.01) | |
| C09D 11/40 | (2014.01) | |

(52) U.S. Cl.
CPC .............. *C09D 11/36* (2013.01); *C08K 3/04* (2013.01); *C08K 5/23* (2013.01); *C08K 5/235* (2013.01); *C08K 5/3417* (2013.01); *C09D 11/10* (2013.01); *C09D 11/322* (2013.01); *C09D 11/324* (2013.01); *C09D 11/40* (2013.01); *C09D 133/10* (2013.01); *C09D 179/02* (2013.01)

(58) Field of Classification Search
CPC .................................................... C09D 11/36
See application file for complete search history.

(56) References Cited

U.S. PATENT DOCUMENTS

| 7,767,013 B2 | 8/2010 | Uozumi et al. |
|---|---|---|
| 8,038,784 B2 | 10/2011 | Watanabe et al. |
| 8,507,585 B2 | 8/2013 | Hosoya et al. |
| 2009/0198003 A1* | 8/2009 | Endo .................. C09D 11/322 524/315 |
| 2009/0281219 A1* | 11/2009 | Watanabe ............ C09D 11/326 524/317 |
| 2010/0092676 A1* | 4/2010 | Uozumi ................ C09D 11/38 427/265 |
| 2011/0045257 A1 | 2/2011 | Arai et al. |
| 2012/0001979 A1 | 1/2012 | Watanabe et al. |
| 2012/0083567 A1 | 4/2012 | Hosoya et al. |
| 2013/0038658 A1* | 2/2013 | Shimizu .............. C09D 11/324 347/20 |
| 2013/0201264 A1* | 8/2013 | Terakado .............. C09D 11/30 347/100 |
| 2014/0011942 A1 | 1/2014 | Hosoya et al. |

FOREIGN PATENT DOCUMENTS

| CN | 101104759 A | 1/2008 |
|---|---|---|
| CN | 101575468 A | 11/2009 |
| CN | 102015924 A | 4/2011 |
| EP | 1 790 698 A | 5/2007 |
| EP | 1857511 A1 | 11/2007 |
| EP | 2119746 A2 | 11/2009 |
| EP | 2365040 A1 | 9/2011 |
| JP | 2003-261808 A | 9/2003 |
| JP | 2007-126564 A | 5/2007 |

OTHER PUBLICATIONS

Office Action issued in China Counterpart Patent App. No. 201410832056.3, dated Apr. 25, 2016.
European search report issued with respect to application No. 14198472.4, mail date is Mar. 20, 2015.

* cited by examiner

*Primary Examiner* — Bruce H Hess
*Assistant Examiner* — Christopher Polley
(74) *Attorney, Agent, or Firm* — Greenblum & Bernstein, P.L.C.

(57) ABSTRACT

An inkjet printing process including forming an image by superposing two or more kinds of inks, wherein the two or more kinds of inks contain (A) an ink containing at least a first coloring material, a non-aqueous solvent, a non-aqueous resin, and a water-soluble resin having an amino group, and (B) an ink containing at least a second coloring material, a non-aqueous solvent, and a nitrogen-containing graft copolymer having a polyester side chain, and a non-aqueous ink set containing the ink (A) and the ink (B).

15 Claims, No Drawings

INKJET PRINTING PROCESS AND NON-AQUEOUS INK SET

BACKGROUND

Technical Field

The present invention relates to an inkjet printing process using an ink set formed of two kinds of inks, and a non-aqueous ink set used in the inkjet printing process.

Related Art

An inkjet recording system is a print system in which printing is conducted by injecting a liquid ink having high fluidity from a fine nozzle to thereby allow the liquid ink to adhere to a recording medium such as paper. This system is a relatively inexpensive device and has a characteristic that it can print an image having a high resolution and a high quality at a high-speed with low noise, and thus has been spread rapidly in recent days.

Coloring materials for inks used in inkjet recording systems are roughly classified into those utilizing pigments and those utilizing dyes. Among these, inks using pigments as coloring materials tend to increase since they are excellent in light resistance, weather resistance and water resistance that are required for high-quality printing.

In terms of solvents, inks are roughly classified into aqueous inks and non-aqueous inks. Non-aqueous inks that do not use water as an ink solvent, including solvent-based inks containing a volatile solvent as the main constituent and oil-based inks containing a non-volatile solvent as the main constituent, have gained attention since they have characteristics that they have fine stability on printing machines (intermittent discharge property, discharge restoration property after leaving a long period, and the like), they cause no curl on printing papers, they require a short time for the permeation and drying of the inks, and the like (see, for example, Japanese Patent Application Publication No. 2003-261808 and Japanese Patent Application Laid-Open No. 2007-126564).

SUMMARY

However, in the non-aqueous inks and the inkjet printing processes using the non-aqueous inks of above-mentioned conventional technologies, a sufficient image density (printing) or a brilliant image was not be able to be obtained in some cases depending on the kind of the printing paper used. Therefore, the present invention aims at providing an inkjet printing process by which a sufficient image density or a brilliant image can be obtained, and a non-aqueous ink set used in the inkjet printing process.

The present invention that solves the above-mentioned problem is as follows.

(1) An inkjet printing process including forming an image by superposing two or more kinds of inks, wherein the two or more kinds of inks contain (A) an ink containing at least a first coloring material, a non-aqueous solvent, a non-aqueous resin, and a water-soluble resin having an amino group, and (B) an ink containing at least a second coloring material, a non-aqueous solvent, and a nitrogen-containing graft copolymer having a polyester side chain.

(2) The inkjet printing process according to (1), wherein the image is a composite black image, and the first coloring material contains carbon black.

(3) The inkjet printing process according to (1) or (2), wherein the second coloring material contains copper phthalocyanine.

(4) The inkjet printing process according to (1), wherein the image is a color image, and the first coloring material and the second coloring material contain coloring materials of chromatic colors.

(5) The inkjet printing process according to any of (1) to (4), wherein the non-aqueous resin is an acrylic polymer formed of a copolymer of a monomer mixture containing (a) an alkyl(meth)acrylate having an alkyl group having 8 to 18 carbon atoms, and (b) a monomer having a β-diketone group or a β-ketoacid ester group.

(6) The inkjet printing process according to any of (1) to (5), wherein an image is formed by superposing the ink (B) on the ink (A).

(7) The inkjet printing process according to any of (1) to (6), wherein the water-soluble resin is a polyethyleneimine.

(8) A non-aqueous ink set, containing (A) an ink containing at least a first coloring material, a non-aqueous solvent, a non-aqueous resin, and a water-soluble resin having an amino group, and (B) an ink containing at least a second coloring material, a non-aqueous solvent, and a nitrogen-containing graft copolymer having a polyester side chain.

According to the present invention, an inkjet printing process by which a sufficient image density or a brilliant image can be obtained, and a non-aqueous ink set used in the inkjet printing process, can be provided. Especially, the density of a black image can be improved.

DETAILED DESCRIPTION

<Inkjet Printing Process>

The inkjet printing process of the present invention is characterized by being an inkjet printing process including forming an image by superposing two or more kinds of inks, wherein the two or more kinds of inks contain (A) an ink containing at least a first coloring material, a non-aqueous solvent, a non-aqueous resin, and a water-soluble resin having an amino group, and (B) an ink containing at least a second coloring material, a non-aqueous solvent, and a nitrogen-containing graft copolymer having a polyester side chain.

Firstly, the non-aqueous ink set (ink (A) and ink (B)) of the present invention, which is an ink set used in the inkjet printing process of the present invention, will be explained.

[Ink (A)]

In the present invention, the ink (A) contains at least a first coloring material, a non-aqueous solvent, a non-aqueous resin, and a water-soluble resin having an amino group.

(First Coloring Material)

Examples of the first coloring material include pigments and dyes. The pigments and dyes will be respectively explained.

(Pigments)

The ink (A) may have any color, and thus pigments including organic pigments such as azo pigments, phthalocyanine pigments, polycyclic pigments and dye lake pigments, and inorganic pigments can be used. The azo pigments include soluble azo lake pigments, insoluble azo pigments and condensed azo pigments. The phthalocyanine pigments include metal phthalocyanine pigments and non-metal phthalocyanine pigments. The polycyclic pigments include quinacridone-based pigments, perylene-based pigments, perinone-based pigments, isoindoline-based pigments, isoindolinone-based pigments, dioxadine-based pigments, thioindigo-based pigments, anthraquinone-based pigments, quinophthalone-based pigments, metal complex pigments and diketopyrrolopyrrole (DPP) and the like. Typical inorganic pigments include carbon black and titanium oxide and the like. These pigments may be used singly or in combination of two or more kinds.

The content of the pigment in the ink (A) is generally from 0.01 to 20% by mass, and preferably from 1 to 15% by mass, more preferably from 5 to 10% by mass, from the viewpoints of printing density and ink viscosity.

(Dyes)

Examples of the dyes include oil-soluble dyes such as azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metalphthalocyanine dyes.

Any one kind of these dyes may be used singly, or two or more kinds of these dyes may be used in combination.

The content of the dye in the ink (A) is generally from 0.01 to 10% by mass, and is preferably from 0.3 to 5% by mass, more preferably from 0.5 to 3% by mass from the viewpoints of printing density and ink viscosity.

The first coloring material is preferably a pigment, and carbon black can be exemplified as a pigment that can further exert the effect of the present invention in the cases when black printing with a higher density is intended. In the cases when brilliant color printing is intended, BONA Barium Lake, BONA Calcium Lake, BONA Strontium Lake, Brilliant Carmine 6B, Quinacridone Magenta, Rhodamine Y, Disazo Yellow and Benzimidazolone Yellow can be exemplified.

The average particle size of the first coloring material is preferably 300 nm or less, more preferably 200 nm or less from the viewpoints of dispersibility and storage stability. Meanwhile, the average particle size of the coloring material is a value measured by a laser diffraction type particle size distribution measurement device LB950 manufactured by Horiba, Ltd.

(Non-Aqueous Solvent)

As the non-aqueous solvent, either of a nonpolar organic solvent and a polar organic solvent can be used. These may be used singly, or can be used in combination of two or more kinds as long as a single phase is formed. From the viewpoint of decreasing of viscosity, it is preferable to use a nonpolar organic solvent.

The content of the nonpolar organic solvent is preferably 20% by mass or more, more preferably 40% by mass or more, further preferably 50% by mass or more, with respect to the total mass of the ink and the solvent. When the content of the hydrocarbon-based nonpolar solvent is 20% by mass or more with respect to the whole amount of the solvent, the viscosity can be sufficiently lowered.

In the case when the content of the nonpolar organic solvent is 50% by mass or more with respect to the total mass of the ink and the solvent, the ink viscosity can further be lowered. When the content of the nonpolar organic solvent becomes 50% by mass or more with respect to the total mass of the ink and the solvent, the water-soluble resin is released little in the ink and the solvent, but gathers in the vicinity of the coloring material and is strongly adsorbed on the surface of the coloring material. Therefore, it is supposed that an effect of decreasing viscosity can be obtained not only by decreasing the viscosity of the solvent itself, but also by that the amount of the free resin in the solvent can be decreased.

Preferable examples of the nonpolar organic solvents can include petroleum-based hydrocarbon solvents such as aliphatic hydrocarbon solvents, alicyclic hydrocarbon solvents and aromatic hydrocarbon solvents. Examples of the aliphatic hydrocarbon solvents and alicyclic hydrocarbon solvents may include paraffin-based, isoparaffin-based and naphthene-based solvents. Examples may include those sold under the following trade names. Teclean N-16, Teclean N-20, Teclean N-22, Naphthesol L, Naphthesol M, Naphthesol H, Solvent No. 0-L, Solvent No. 0-M, Solvent No. 0-H, Isozol 300, Isozol 400, AF Solvent No. 4, AF Solvent No. 5, AF Solvent No. 6 and AF Solvent No. 7 (all of these are manufactured by JX Nippon Oil & Energy); Isopar G, Isopar H, Isopar L, Isopar M, Exxol D40, Exxol D80, Exxol D100, Exxol D130 and Exxol D140 (all of these are manufactured by Tonen General Sekiyu K. K.). Examples of the aromatic hydrocarbon solvents include Grade Alkene L and Grade Alkene 200P (all of these are manufactured by JX Nippon Oil & Energy), Solvesso 200 (manufactured by Tonen General Sekiyu K. K.) and the like.

Examples of the polar organic solvents can include ester-based solvents, higher alcohol-based solvents, higher aliphatic acid-based solvents and the like. Examples include ester-based solvents having 14 or more carbon atoms in one molecule such as methyl laurylate, isopropyl laurylate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl, soybean oil isobutyl, tall oil methyl, tall oil isobutyl, diisopropyl adipate, diisopropyl sebacate, diethyl sebacate, propylene glycol monocaproate, trimethylolpropane tri-2-ethylhexanoate and glyceryl tri2-ethylhexanoate; higher alcohol-based solvents having 8 or more carbon atoms in a molecule such as isomyristyl alcohol, isopalmityl alcohol, isostearyl alcohol and oleyl alcohol; higher aliphatic acid-based solvents having 9 or more carbon atoms in a molecule such as isononanonic acid, isomyristic acid, hexadecanoic acid, isopalmitic acid, oleic acid and isostearic acid; and the like.

A preferable content in the case when the above-mentioned polar organic solvent is incorporated is as follows. It is preferable that the polar organic solvent is incorporated by 10% by mass or more with respect to the whole amount of the ink. Furthermore, the ratio of the polar organic solvent that accounts for the non-aqueous solvent in the ink is preferably from 10 to 80% in terms of mass ratio, from the viewpoints that sufficient stability can be obtained in a storage container or on a printer, and a printed product having a high density can be obtained without decrease in the image density even a time passes after the printing.

(Non-Aqueous Resin)

As the non-aqueous resin, an acrylic resin formed of a copolymer of a monomer mixture containing (a) an alkyl (meth)acrylate having an alkyl group having at least 8 to 18 carbon atoms, and (b) a monomer having a β-diketone group or a β-ketoacid ester group, an oil-modified alkid resin and/or an aliphatic acid-modified alkid resin, and an oil-modified polyester resin and/or an aliphatic acid-modified polyester resin having an oil length composed of an oil and/or an aliphatic acid having an iodine value of 100 $gI_2$/100 g or more of 50% by mass or more, or an epoxy resin having an alkyl group having 8 to 18 carbon atoms, and the like, and an acrylic resin composed of the above-mentioned copolymer is specifically preferable from the viewpoints of improvement of printing density and suppression of strike through.

The above-mentioned acrylic resin has high compatibility with the hydrocarbon-based nonpolar solvent of the above-mentioned non-aqueous solvent, and thus is put into a state in which the acrylic resin is dissolved in the non-aqueous solvent, by having an alkyl group having 8 to 18 carbon atoms, whereas the acrylic resin can decrease the viscosity of the ink and can improve the low temperature suitability by containing a β-diketone group or a β-ketoacid ester group. Furthermore, since the increase of the viscosity is suppressed, the acrylic resin also contributes to the electrostatic flocculation and fixing of the ink during the landing of the ink onto the recording medium, and consequently can improve the printing density and attain the suppression of strike through.

In the above-mentioned acrylic resin, when the number of the carbon atoms of the alkyl group becomes 19 or more, the water-insoluble resin may be easily solidified at a low temperature, and the low temperature suitability may be deteriorated. On the other hand, in the case when the number of the carbon atoms is 7 or less, the compatibility with the hydrocarbon-based nonpolar solvent decreases and the coloring material cannot be stably dispersed, and thus the storage stability may be deteriorated, and the viscosity of the ink may be increased. Furthermore, the ink viscosity further increases under a low temperature environment, and thus the low temperature suitability is deteriorated. The number of the carbon atoms in the above-mentioned alkyl group is more preferably from 12 to 18.

The above-mentioned alkyl group having 8 to 18 carbon atoms may be either a straight chain or a branched chain. Specific examples include an octyl group, a nonyl group, a decyl group, a dodecyl group, a tridecyl group, a tetradecyl group, a pentadecyl group, a hexadecyl group, a heptadecyl group, an octadecyl group and the like, and those may also be plurally contained.

Preferable examples of the β-diketone group that constitutes the functional group include an acetacetyl group, a propionacetyl group and the like, and preferable examples of the β-ketoacid ester group include an acetacetoxy group, a propionacetoxy group and the like.

Although the molecular weight (weight average molecular weight) of the acrylic resin is not especially limited, in the case of use as an inkjet ink, the molecular weight is preferably from about 5,000 to about 50,000, more preferably from about 10,000 to 30,000 in view of the dischargeability of the ink.

The glass transition temperature (Tg) of the acrylic resin is preferably an ordinary temperature or less, more preferably 0° C. or less. By this way, film formation can be promoted at an ordinary temperature when the ink is fixed on the recording medium.

The alkyl(meth)acrylate (a) is an alkyl (meth)acrylate having an alkyl group having 8 to 18 carbon atoms and forms the main chain of the main chain together with the monomer (b), and the alkyl group constitutes the functional group of the main chain. Examples of the alkyl(meth)acrylate (a) can preferably include palmityl/stearyl methacrylate (C16/C18), cetyl acrylate (C16), dodecyl methacrylate (C12), dodecyl acrylate (C12), 2-ethylhexyl methacrylate (C8) and 2-ethylhexyl acrylate (C8). These can be used singly or by suitably mixing.

The monomer (b) is a (meth)acrylate or (meth)acrylamide having a β-diketone group or a β-ketoacid ester group and forms the main chain of the acrylic resin together with the alkyl(meth)acrylate (a), and the β-diketone group or β-ketoacid ester group constitutes the functional group of the main chain. By containing this monomer (b), the viscosity of the ink can be decreased, and the low temperature suitability can further be improved. Furthermore, since the increase in viscosity is suppressed, the monomer also contributes to the electrostatic flocculation and fixing of the ink during the landing of the ink onto the recording medium, and consequently, the printing density can be improved, and suppression of strike through can be attained.

Preferable examples of the monomer (b) can include a (meth)acrylate and a (meth)acrylamide containing a β-diketone group or a β-ketoacid ester group in the ester chain. More specifically, examples include acetacetoxyalkyl (meth)acrylates such as acetacetoxyethyl (meth)acrylate, acetacetoxyalkyl (meth)acrylamides such as hexadione (meth)acrylate and acetacetoxyethyl (meth)acrylamide, and the like. These can be used singly, or in combination of two or more kinds.

In the above-mentioned monomer mixture (the alkyl (meth)acrylate (a) and the monomer (b)), the alkyl(meth) acrylate (a) is contained by preferably 30% by mass or more, more preferably from 40 to 95% by mass, further preferably from 50 to 90% by mass. The monomer (b) is preferably from 3 to 30% by mass, more preferably from 5 to 20% by mass.

The above-mentioned respective monomers can be easily polymerized by known radical copolymerization. The reaction system is preferably conducted by solution polymerization or dispersion polymerization. In this case, in order to adjust the molecular weight of the acrylic resin after the polymerization to be within the above-mentioned preferable range, it is effective to use a chain transfer agent in combination during the polymerization. As the chain transfer agent, for example, thiols such as n-butylmercaptan, laurylmercaptan, stearylmercaptan and cyclohexylmercaptan are used.

As the polymerization initiator, known thermal polymerization initiators including azo compounds such as AIBN (azo bisisobutyronitrile), peroxides such as t-butylperoxybenzoate, t-butylperoxy-2-ethylhexanoate (Perbutyl O manufactured by NOF Corporation) and the like can be used. Furthermore, photopolymerization type initiators that generate radical by irradiation of active energy ray can be used. For the polymerization solvent used for solution polymerization, for example, petroleum-based solvents (aroma free (AF)-based) and the like can be used. For this polymerization solvent, it is preferable to select one or more kind selected from solvents that can be directly used as non-aqueous solvents for inks (these will be mentioned below). In the polymerization reaction, a polymerization inhibitor, a polymerization promoter, a dispersant and the like that are generally used can further be added to the reaction system.

The acrylic resin in the present invention is preferably a comb-like structure having urethane groups as side chains with respect to the main chain of the acrylic resin that is constituted by the alkyl (meth) acrylate (a) and the monomer (b). By the alkyl group having 8 to 18 carbon atoms of the alkyl (meth)acrylate (a), the affinity with the hydrocarbon-based nonpolar solvent of the non-aqueous solvent mentioned below is improved, and thus the solubility in the solvent is ensured. On the other hand, the coloring material is adsorbed by the side chains of the urethane groups, whereby the storage stability can be improved.

The urethane groups on the side chains can be introduced by using a (meth)acrylate having a functional group that can react with an amino group in addition to the alkyl(meth) acrylate (a) and monomer (b), by the reaction of the functional group that can react with an amino group, with an aminoalcohol and a polyvalent isocyanate compound, which will be mentioned below. As the functional group that can react with an amino group, a glycidyl group, a vinyl group and a (meth)acryloyl group can be preferably exemplified.

As the (meth)acrylate having a glycidyl group, glycidyl (meth)acrylate is exemplified, and as the (meth)acrylate having a vinyl group, vinyl (meth)acrylate, 2-(2-vinyloxyethoxy)ethyl (meth)acrylate and the like are preferably exemplified. As the (meth)acrylate having a (meth)acryloyl group, dipropylene glycol di(meth)acrylate, 1,6-hexanediol di(meth)acrylate and the like are exemplified. Plural kinds of these (meth)acrylates may be contained. These (meth)acrylates having a functional group that can react with an amino group can also be used in the cases when urethane groups are not introduced.

When the aminoalcohol reacts with and binds to the functional group that can react with an amino group, and the isocyanate ester group ($R^1N=C=O$) of the polyvalent isocyanate compound reacts by an addition reaction with the hydroxyl group of the aminoalcohol as mentioned below, an urethane group (urethane bond)(carbamic acid ester: $R^1NHCOOR$) is introduced. The R—herein indicates the aminoalcohol part that is bonded to the aminoalcohol part of the copolymer.

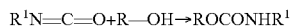

By the above-mentioned reaction, urethane groups that act as adsorbing groups for coloring materials are introduced.

As the aminoalcohol, monomethylethanolamine, diethanolamine, dipropanol amine and the like can be exemplified. Among these, aminoalcohols having two hydroxyl groups are preferably dialkanolamines represented by the general formula $(HOR)_2NH$ (wherein R is a bivalent hydrocarbon group) (secondary alkanolamines) since the number of the formed amino alcohols can be increased. These aminoalcohols can be used by combining plural kinds.

From the viewpoint of introducing urethane groups, the aminoalcohol is reacted with the functional group that can react with an amino group of the above-mentioned (meth) acrylate, in preferably from 0.05 to 1 molar equivalent amount, more preferably from 0.1 to 1 molar equivalent amount. In the case when the aminoalcohol is less than 1 molar equivalent amount, unreacted functional groups remain in the (meth)acrylate having a functional group that can react with an amino group, but the remaining functional groups are considered to act as adsorbing groups for coloring materials.

Examples of the polyvalent isocyanate compound include aliphatic, alicyclic and aromatic polyvalent isocyanate compounds such as 1,6-diisocyanatehexane, 1,3-bis(isocyanatemethyl)benzene, 1,3-bis(isocyanatemethyl)cyclohexane and 1,5-naphthalenediisocyanate, and plural kinds can also be used. It is preferable that the polyvalent isocyanate compound is reacted in an approximately equivalent amount (0.98 to 1.02 molar equivalent amount) with respect to the hydroxy groups contained in the charged raw materials so that unreacted raw materials and the like would not remain in introducing urethane groups by the reaction with the hydroxyl groups.

The mass ratio of the copolymer part to the introduced urethane groups in the acrylic resin is preferably from 80:20 to 99:1, more preferably from 85:15 to 95:5. The mass of the copolymer part in the acrylic resin is the total mass of the monomers used for the copolymerization, and the mass of the introduced urethane group parts is the total mass of the aminoalcohol and polyvalent isocyanate compound used for the reaction. Since the urethane group parts have high adsorbability against the coloring material, it is considered that the adsorption rate against the coloring material increases as the mass ratio of the urethane group part increases, whereas, contrary to expectations, when the mass ratio is higher than 20, the compatibility with solvents is deteriorated, and the free water-insoluble resin increases, and conversely, the adsorption rate against the coloring material decreases.

The content of the non-aqueous resin to the coloring material is preferably 1% by mass or more, more preferably 10% by mass or more, from the viewpoint of ensuring dispersibility. On the other hand, when the content of the non-aqueous resin is too high, the viscosity of the ink increases, and the storage stability under a high temperature environment may be deteriorated, and thus the content is preferably 200% by mass or less, more preferably 100% by mass or less. Namely, the content of the non-aqueous resin in the coloring material is preferably from 1 to 200% by mass, more preferably from 2 to 100% by mass.

(Water-Soluble Resin having Amino Group)

Examples of the water-soluble resin having an amino group can include basic polymer electrolytes or derivatives thereof such as polyethyleneimine (PEI), polyvinylamine and polyvinylpyridine, and especially, polyethyleneimines having a weight average molecular weight of from 200 to 2,000, or modified polyethyleneimines obtained by an addition reaction of a polyethyleneimine having a weight average molecular weight of from 200 to 2,000 with either of an acrylic acid ester or a vinyl compound can be preferably used. The modified polyethyleneimines are preferably those having a ratio to the acrylic acid ester or vinyl compound of 0.3 molar equivalent amount or more and lower than 1 molar equivalent amount in the case when the total amine value of the polyethyleneimine is 1 molar equivalent amount (hereinafter simply referred to as modified polyethyleneimine). The amine value as used herein is calculated by obtaining an amine value (KOH mg/g) by (2) Indicator Titration Method of JIS K-7237-1995 (Method for testing total amine value of amine curing agent for epoxy resin), and converting the amine value with the molecular weight of KOH: 56.11 mg/mmol.

When the weight average molecular weight of the polyethyleneimine is lower than 200, the effect of increasing densities s against plain paper is low, whereas when the weight average molecular weight is 2,000 or more, the storage stability is deteriorated depending on storage environments. The weight average molecular weight of the polyethyleneimine is more preferably from 300 to 1,800, since the effect of increasing density is high, and the pour point is −5° C. or less and the storage stability at low temperatures is fine.

It is possible to use a commercially available polyethyleneimine, and preferable examples can include Epomin SP-006, Epomin SP-012, Epomin SP-018 and Epomin SP-200 manufactured by Nippon Shokubai Co., Ltd.; and Lupasol FG, Lupasol G20 Waterfree and Lupasol PR8515 manufactured by BASF, and the like.

As the polyethyleneimine, a modified polyethyleneimine obtained by modifying a part of the amino groups of the polyethyleneimine with an acrylic acid ester, a vinyl compound, a monoisocyanate or the like can be used. The degree of the modification is desirably 0.8 molar equivalent amount or less of the reaction groups of the substance used for the modification in the case when the amine value of the polyethyleneimine is 1 molar equivalent amount. When the modification is conducted with going beyond 0.8 molar equivalent amount, the storage stability is deteriorated depending on storage environments.

When the modified polyethyleneimine is used, the nozzle plate ink repellency can be improved. The mechanism of improvement is supposed as follows. Namely, the imino group and amino group (—NH and —NH$_2$) that are present in an ink using a polyethyleneimine tend to be fixed on a nozzle plate of an inkjet head. By using the modified polyethyleneimine modified by using an acrylic acid ester, a vinyl compound, a monoisocyanate or the like with respect to the imino group and amino group of the polyethyleneimine, the ink repellency is increased, and thus the wettability on a nozzle plate is improved.

Preferable acrylic acid esters can include methyl acrylate, ethyl acrylate, t-butyl acrylate, n-butyl acrylate, 2-ethylhexyl acrylate and the like.

Preferable examples of the vinyl compound can include acrylonitrile, vinyl halogenates such as vinyl chloride and vinyl fluoride, vinyl acetate and the like.

The modified polyethyleneimine can be obtained by conducting Michael addition of an acrylic acid ester or a vinyl compound to the imino group and amino group of the polyethyleneimine. Specifically, the modified polyethyleneimine can be produced by adding dropwise the polyethyleneimine and the acrylic acid ester or vinyl compound to diethanolamine heated to 50 to 60° C. under stirring, and maintaining the mixture at 50 to 60° C. for 1 to 3 hours.

In the present invention, the content of the water-soluble resin having an amino group is preferably from 0.01 to 0.5, more preferably from 0.05 to 0.3, and even more preferably from 0.1 to 0.2 by the mass ratio against the coloring material. The water-soluble resin is contained with respect to the total amount of the ink by preferably about from 0.1 to 5% by mass, more preferably from 0.5 to 1.5% by mass.

The content of the non-aqueous resin to with respect to the water-soluble resin having an amino group is preferably from 0.1 to 20, more preferably from 0.4 to 10 by mass ratio. Also in the case when the content of the non-aqueous resin is as small as lower than 0.1 or as much as more than 20 by the mass ratio with respect to the water-soluble resin, the storage stability is difficult to be ensured.

The mass of the resin to the coloring material (the total amount of the water-soluble resin and non-aqueous resin) is preferably 0.2 or more with deeming the mass of the coloring material as 1, from the viewpoint of ensuring the effect of dispersibility, and is preferably 1.5 or less from the viewpoints of improvement of the ink viscosity and prevention of discharge defect due to change over time.

[Ink (B)]

In the present invention, the ink (B) contains at least a second coloring material, a non-aqueous solvent, and a nitrogen-containing graft copolymer having a polyester side chain.

(Second Coloring Material)

Examples of the coloring materials that can be used as the second coloring material can include those similar to the first coloring materials, and pigments are preferable. Preferable coloring materials include carbon black, BONA barium lake, BONA calcium lake, BONA strontium lake, Brilliant Carmine 6B, Quinacridone Magenta, Rhodamine Y, Disazo Yellow, Benzimidazolone Yellow, Copper Phthalocyanine Blue and Copper Phthalocyanine Green. Furthermore, the content and average particle size of the coloring material are similar to those of the first coloring material.

As the second coloring material, Copper Phthalocyanine Blue and Copper Phthalocyanine Green are preferable since a higher image density can be obtained.

Meanwhile, in the non-aqueous ink set of the present invention, the first coloring material and the second coloring material may be the same.

(Nitrogen-Containing Graft Copolymer having Polyester Side Chain)

The ink (B) in the present invention contains a nitrogen-containing graft copolymer having a polyester side chain (hereinafter this is also referred to as "graft PN") as a dispersant. This is a copolymer having a comb-like structure containing a polyester in the graft chains and a nitrogen-containing polymer in the main chain. Specifically, for example, a polymer that is a compound having a main chain containing many nitrogen atoms such as a polyalkyleneimine and also having plural side chains that are amide-bonded via those nitrogen atoms can be exemplified. Such polymer is disclosed in, for example, JP 5-177123 A (U.S. Pat. No. 4,645,611).

The nitrogen-containing polymer as the main chain preferably has a weight average molecular weight of 600,000 or less and preferably has plural side chains, and the side chains each has a polymerization degree of preferably about 3 to 80, but are not limited to these. The main chain is preferably a polyalkyleneimine such as polyethyleneimine, and the polyalkyleneimine may be either a straight chain or a branched chain, and is more preferably a branched chain. Each side chain is preferably a polymer having (carbonyl-C3 to C6-alkyleneoxy group) as a unit, and is preferably bonded to the main chain via an amide or a salt crosslinking group.

Examples of commercially available products that can be preferably used include Solsperse 28000, Solsperse 11200 and Solsperse 13940 manufactured by Lubrizol Japan, and the like.

(Non-Aqueous Solvent)

As the non-aqueous solvent, those similar to the non-aqueous solvents for the ink (A) can be exemplified, and preferable examples and embodiments of use are also similar.

Where necessary, the ink (A) and ink (B) in the present invention can contain various additives that are generally used in the art besides the above-mentioned respective components, to the extent that the effect of the present invention is not inhibited. Specifically, an anionic surfactant, a cationic surfactant, an amphoteric surfactant, a nonionic surfactant, or a polymer-based, silicone-based or fluorine-based surfactant can be incorporated in the ink as a defoaming agent, a surface tension decreasing agent or the like.

As the antioxidant, known antioxidants such as dibutyl-hydroxytoluene, propyl gallate, tocopherol, butylhydroxyanisole and nordihydroguaiaretic acid can be used, and these may be used singly or by mixing two or more kinds.

The ink (A) and ink (B) can be prepared by mixing the incorporated components by using an optional dispersion unit such as a ball mill and a bead mill, and can be produced, for example, by firstly preparing a dispersion containing the coloring material, the dispersant and the non-aqueous solvent, and further adding the non-aqueous solvent and other optional components thereto. The non-aqueous solvent (or dilution solvent) in the preparation of the dispersion is preferably the same as the non-aqueous solvent contained in the ink, and in the case when the dispersant is synthesized by solution polymerization, the non-aqueous solvent is preferably the same as the polymerization solvent.

In the present invention, other inks can also be used besides the above-mentioned ink (A) and ink (B). Examples of the other inks can include an ink that contains a coloring material, a non-aqueous solvent and a water-soluble resin having an amino group but does not contain a non-aqueous resin, an ink that contains a coloring material and a non-aqueous solvent and does not contain either a nitrogen-containing graft copolymer having a polyester side chain or water-soluble resin having an amino group, and the like.

The non-aqueous ink set according to the present invention can be preferably used for an inkjet recording system. The inkjet printer may be any of systems such as a piezo system and an electrostatic system. In the case when an inkjet recording device is used, the printing is conducted so that the ink according to the present invention is discharged from an inkjet head based on a digital signal, and the discharged ink droplets adhere to a recording medium.

The suitable range of the viscosity of the ink in the case of use as an inkjet ink differs depending on the nozzle diameter of the discharge head and the discharging environment and the like, and in general, the viscosity is preferably from 5 to 30 mPa·s, more preferably from 5 to 15 mPa·s in general, and is even more suitably about 10 mPa·s at 23° C. The viscosity herein referred to as a value at 10 Pa when a shear stress is increased from 0 Pa at a velocity of 0.1 Pa/s at 23° C.

For the inkjet printing process of the present invention, it is preferable to apply an inkjet printing process in which an image is formed by superposing two or more kinds of inks including the above-mentioned ink (A) and ink (B), which is so-called "single pass system". The inkjet printing process of "single pass system" is a method using a line type inkjet head (line head) in which plural inkjet heads are disposed in a length equal to or more than the width of a printing region, in which all printing areas are formed when a printing medium passes once under the line head. The printing unit of the printing device includes a transport unit that is configured to transport a printing medium, and an inkjet head unit that is configured to discharge the above-mentioned non-aqueous ink set onto the printing medium. The transport unit includes a transport belt that is disposed so as to oppose to the inkjet head unit, and a driving unit that is configured to drive the transport belt. The inkjet head unit includes a line head (a) and a line head (b) that retain the non-aqueous ink set, i.e., the ink (A) and the ink (B), respectively. The line heads (a) and (b) are disposed on the upper side of the transport belt, and plural nozzles are disposed on each line head in the transport direction and orthogonal direction of the printing medium. The inkjet head unit discharges the ink from the respective inkjet heads onto the printing medium that is fed from a paper feeding unit and transported by the transporting belt.

By printing the ink (A) and ink (B) by this way, black printing or brilliant color printing with a higher density than that in the case when the ink (A) is used singly can be attained.

The reason for that the effect of the present invention can be obtained is considered as follows, although it is only a speculation. The water-soluble resin having an amino group contained in the ink (A) has high polarity, and thus does not dissolve in the non-aqueous solvent. Namely, it is considered that the affinity with the non-aqueous solvent is not too high, and thus the solvent release property (the separability between the coloring material and the solvent) is fast, and the coloring material easily remains on paper. Furthermore, it is considered that, in the case when the ink (A) and the ink (B) are mixed, this dispersant having high polarity also has high affinity for the second coloring material, and thus the interaction between the first coloring material and the second coloring material is enhanced, and the coloring material remains more easily on paper. Consequently, the image density can be significantly increased. Alternatively, in the case of a color image, a brilliant image can be provided.

A desirable image density cannot be obtained by using, for example, a combination of a black ink containing a graft PN as a dispersant and a color ink containing a graft PN as a dispersant, instead of the above-mentioned combination.

As the image formed by the inkjet printing process of the present invention, a composite black image is especially preferable from the viewpoint that the density can be increased more. In this case, the ink (A) contains carbon black as the first coloring material. The composite black image is obtained by the mixing of the black ink and color ink on the recording medium during recording, and in the present invention, a composite black image can be obtained by using a black ink as the ink (A) and a color ink as the ink (B). Furthermore, as mentioned above, according to the process of the present invention, the image density can be significantly increased, and thus the image density of the composite black image can further be increased.

Furthermore, as the second coloring material in the ink (B), it is preferable to use a copper phthalocyanine such as Copper Phthalocyanine Blue and Copper Phthalocyanine Green from the viewpoint that a higher image density can be obtained as mentioned above.

On the other hand, in the case when an image formed by the inkjet printing process according to the present invention is a color image, it is preferable to include coloring materials of chromatic colors as the first coloring material in the ink (A) and the second coloring material in the ink (B), from the viewpoint of obtaining a more brilliant image. As the coloring materials of chromatic colors, coloring materials of colors other than black, white and gray among the above-mentioned coloring materials can be used.

In the present invention, it is preferable to form an image by superposing the ink (B) on the ink (A) from the viewpoint that a high image density can be obtained. In other words, it is preferable to discharge the ink (A) firstly among the ink (A) and the ink (B). Hereinafter the ink that is firstly discharged is sometimes referred to as a first discharge ink, and the ink that is discharged later is sometimes referred to as a second discharge ink. When the first discharge ink is the ink (A), the second discharge ink is the ink (B), whereas when the first discharge ink is the ink (B), the second discharge ink is the ink (A).

In the case when the first discharge ink is the ink (A) and the second discharge ink is the ink (B), the line head (a) is disposed on the upperstream with respect to the transport direction of the printing medium, and the line head (b) is disposed on the downstream. In the case when the first discharge ink is the ink (B) and the second discharge ink is the ink (A), the line head (b) is disposed on the upperstream with respect to the transport direction of the printing medium, and the line head (a) is disposed on the downstream.

In the present invention, printing is carried out by using two liquids of the ink (A) and the ink (B) as mentioned above, and the ratio of the droplets of the ink (A) and the droplets of the ink (B) at this time is preferably from 90:10 to 10:90, more preferably from 80:20 to 20:80 by volume ratio.

The time until the other image is superposed on the image formed by either one of the ink (A) and the ink (B) is set to be preferably 0.01 second or more, more preferably 0.03 seconds or more.

The printing medium used in the present invention is not especially limited, and plain paper, high-quality plain paper, inkjet (IJ) paper, IJ matte paper, coated paper in which an ink-absorbing solution coats a recording medium, micro-coated paper having a thinner ink absorbing layer than that of coated paper, glossy paper (photo glossy paper), special paper, fabric or the like can be used.

EXAMPLES

Hereinafter the present invention will further be specifically explained by Examples, but the present invention is not limited to the following Examples.

Examples 1 to 12 and Comparative Examples 1 to 5

<Synthesis of Acrylic Polymer (1)>

75 parts by mass of AF-4 (naphthene-based solvent; manufactured by JX Nippon Oil & Energy Corporation) was charged in a 300 ml four-necked flask, the flask was aerated with nitrogen gas, and the temperature was raised to 110° C. under stirring. Subsequently, a mixture of 16.7 parts by mass of AF-4 and 2 parts by mass of Perbutyl O (t-butylperoxy-2-ethylhexanoate; manufactured by NOF Corporation) was added dropwise over 3 hours to each monomer mixture having the composition shown in Table 1, while the temperature was maintained at 110° C. Subsequently, Perbutyl O was added at after 1 hour and 2 hours by 0.2 parts by mass each while the temperature was retained at 110° C. Furthermore, aging was conducted at 110° C. for 1 hour, and the product was diluted with 10.6 parts by mass of AF-4, whereby a solution of colorless, transparent acrylic polymer (1) (non-aqueous resin) with 50% of a non-volatile component was obtained. The obtained acrylic polymer (1) had a weight average molecular weight (GPC method, in terms of standard polystyrene) was 21,000.

TABLE 1

| Monomer mixture | VMA (C22) | Behenyl methacrylate (manufactured by NOF Corporation) | 50 |
| | LMA (C12) | Dodecyl methacrylate (manufactured by Kao Corporation) | 15 |
| | AAEM | Acetacetoxyethyl methacrylate (manufactured by Nippon Synthetic Chemical Industry Co., Ltd.) | 30 |
| | GMA | Glycidyl methacrylate (manufactured by NOF Corporation) | 5 |

(% by mass)

<Synthesis of Acrylic Polymer (2)>

200 g of the solution of the acrylic polymer (1) obtained above (AF-7, solid content in solvent 50%), 4.0 g of a Micheal adduct (diethanolamine/2-ethylhexylacrylate adduct) and 2.8 g of diethanolamine (manufactured by Nippon Shokubai Co., Ltd.) were charged in a 500 mL four-necked flask, the flask was aerated with nitrogen gas, and the temperature was raised to 110° C. The reaction between the glycidyl group and diethanolamine of the acrylic polymer (1) was completed while the temperature was maintained at 110° C. for 1 hour. Subsequently, 0.2 g of dibutyltin dilaurate was added, and a mixture of 7.8 g of Takenate 600 (1,3-bis(isocyanatomethyl)cyclohexane, manufactured by Mitsui Chemical Polyurethane) and 72.0 g of Exepearl HL (hexyl laurate, manufactured by Kao Corporation) was added dropwise over 1 hour. After the dropwise addition, the mixture was allowed to react for 6 hours while the temperature was raised to 120° C., and the product was cooled to give a solution of an acrylic polymer (2) (non-aqueous resin) having a solid content of 40%.

<Preparation of Ink>

8 parts by mass of the solution of the acrylic polymer (1) as a non-aqueous resin (pigment dispersant), 1 part by mass of a polyethyleneimine as a water-soluble resin having an amino group (Epomin SP-012 manufactured by Nippon Shokubai Co., Ltd.), 10 parts by mass of a pigment (carbon black, MA77 manufactured by Mitsubishi Chemical Corporation) as a coloring material, 20 parts by mass of AF-4 and 20 parts by mass of butyl oleate were mixed, zirconia beads (diameter: 0.5 mm) were put therein, and the mixture was dispersed for 6 hours by a rocking mill (manufactured by Seiwa Giken Co., Ltd). After the dispersion, the zirconia beads were removed, and 35 parts by mass of AF-7 and 6 parts by mass of butyl oleate were added, and the mixture was diluted and filtered by membrane filters of 3 μm and 0.8 μm, respectively, and the coarse particles were removed to give an ink (1).

Similarly, the inks of the respective Examples and Comparative Examples were obtained in similar manners to that of the above-mentioned Example 1 by the compositions shown in Table 2. The ink (1), (2) and (11) are the ink (A), and the others are the ink (B). Furthermore, the combinations of the ink (A) and ink (B) were deemed as ink sets, and using the respective ink sets, images were printed by the order of discharge shown in Table 3 (the order of the first discharge ink and second discharge ink), and the density s thereof were evaluated. In Table 3, the numbers in the brackets correspond to the inks (1) to (13) in Table 2.

TABLE 2

| | | | Inks | | | | | | | | | | | | |
|---|---|---|---|---|---|---|---|---|---|---|---|---|---|---|---|
| | | | (1) | (2) | (3) | (4) | (5) | (6) | (7) | (8) | (9) | (10) | (11) | (12) | (13) |
| Pigments | | | | | | | | | | | | | | | |
| Carbon Black | MA77 (Mitsubishi Chemical Corporation) | | 10 | 10 | 10 | — | — | — | — | — | — | — | — | — | — |
| Copper Phthalocyanine Blue (B-15:4) | KRG (Sanyo Color Works, Ltd.) | | — | — | — | 10 | 10 | — | — | — | — | — | — | — | — |
| Copper Phthalocyanine Blue (B-15:4) | 4940 (Dainichiseika Color & Chemical Mfg. Co., Ltd.) | | — | — | — | — | — | 10 | 10 | — | — | — | — | — | — |
| Copper Phthalocyanine Green (G-7) | LX10343 (Toyocolor Co., Ltd.) | | — | — | — | — | — | — | — | 10 | 10 | — | — | — | — |
| Copper Phthalocyanine Green (G-36) | LX10345 (Toyocolor Co., Ltd.) | | — | — | — | — | — | — | — | — | — | 10 | — | — | — |

TABLE 2-continued

|  |  | Inks | | | | | | | | | | | | |
| --- | --- | --- | --- | --- | --- | --- | --- | --- | --- | --- | --- | --- | --- | --- |
|  |  | (1) | (2) | (3) | (4) | (5) | (6) | (7) | (8) | (9) | (10) | (11) | (12) | (13) |
| Soluble Azo Red (R-57:1) | ECR-102 (Dainichiseika Color & Chemical Mfg. Co., Ltd.) | — | — | — | — | — | — | — | — | — | — | 10 | 10 | — |
| Insoluble Azo Yellow (Y-14) | 2200 (Dainichiseika Color & Chemical Mfg. Co., Ltd.) | — | — | — | — | — | — | — | — | — | — | — | — | 10 |
| Dispersants |  |  |  |  |  |  |  |  |  |  |  |  |  |  |
| Polyethyleneimine | Epomin SP-012 (Nippon Shokubai Co., Ltd.) | 1 | 1 | — | — | — | — | — | — | — | — | 1 | — | — |
| Acrylic polymer (1) (40%) | — | — | 8 | — | — | — | — | — | — | — | — | — | — | — |
| Acrylic polymer (2) (40%) | — | — | — | 8 | — | — | — | — | — | — | — | — | — | — |
| Graft PN (1) | Solsperse 13940 (50%) | — | — | 9 | 9 | — | — | — | — | — | 9 | — | — | 9 |
| Graft PN (2) | Solsperse 28000 | — | — | — | — | 5 | 5 | — | 5 | — | — | — | 5 | — |
| Salt of long chain polyaminoamide and polar acid ester | Disperbic D-101 (525) | — | — | — | — | — | — | 9 | — | 9 | — | — | — | — |
| Solvents |  |  |  |  |  |  |  |  |  |  |  |  |  |  |
| Aliphatic acid ester | Butyl oleate | 26 | 26 | 26 | 26 | 30 | 30 | 26 | 30 | 26 | 26 | 26 | 30 | 26 |
| Alicyclic hydrocarbon | AF4 | 55 | 55 | 55 | 55 | 55 | 55 | 55 | 55 | 55 | 55 | 55 | 55 | 55 |
| Total |  | 100 | 100 | 100 | 100 | 100 | 100 | 100 | 100 | 100 | 100 | 100 | 100 | 100 |

(% by mass)

<Evaluation of Image Density>
(1) Image Density (Composite Black Image)

"ORPHIS EX9050" (Riso Kagaku Corporation) was used as an inkjet recording device. The ORPHIS EX9050 is a system using a 300 dpi line-type inkjet head (respective nozzles are aligned at intervals of about 85 μm), which conducts printing by transporting a paper sheet in the sub scanning direction, which is orthogonal to the main scanning direction (the direction to which the nozzles are aligned).

The first discharge ink and second discharge ink shown in Table 3 were respectively charged in the inkjet recording device. Secondly, the two inks were sequentially discharged by droplets of 24 pl toward a printing medium so that an image formed by the second discharge ink is superposed on an image formed by the first discharge ink, whereby a solid image corresponding to 300 dpi was printed. Furthermore, the image density at after 24 hours had passed (OD value) was measured by a Macbeth densitometer (RD920 manufactured by Macbeth) and evaluated according to the following evaluation criteria. The results of the evaluation are shown in Table 3.

(Evaluation Criteria)

S: The OD value is 1.15 or more
A: The OD value is 1.10 or more and lower than 1.15
B: The OD value is 1.05 or more and lower than 1.10
C: The OD value is lower than 1.05

(2) Image Density (Color)

The evaluation of the densities of the images obtained as above was conducted by sensory evaluation by visual observation according to the following evaluation criteria. The results of the evaluation are shown in Table 3.

A: The color is felt brilliant
B: The color appears as a subdued color

TABLE 3

|  | Examples | | | | | | | | | | | | Comparative Examples | | | | |
| --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 | 5 |
| First discharge ink | (11) | (11) | (1) | (1) | (1) | (2) | (5) | (1) | (1) | (1) | (1) | (1) | (11) | (12) | (1) | (1) | (3) |
| Second discharge ink | (13) | (8) | (4) | (5) | (6) | (6) | (1) | (8) | (10) | (12) | (13) | (3) | (9) | (8) | (11) | (7) | (5) |
| Image concentration (Composite black) | — | — | S | S | S | S | A | S | S | A | B | A | — | — | C | C | C |
| Image concentration (Color) | A | A | — | — | — | — | — | — | — | — | — | — | B | B | — | — | — |

In the printed products obtained by using the ink sets of Examples 1 to 12, high image densities were obtained in the cases of composite black images, whereas images with brilliant colors were obtained in the cases of color images. On the other hand, in the ink sets of Comparative Examples 1 to 5, any sufficient image density or brilliant color was not obtained.

It is understood from the comparison of Example 4 and Example 7 that high image densities were able to be obtained as a result of the printing using the ink (A) containing an acrylic polymer composed of a copolymer of a monomer mixture containing (a) an alkyl(meth)acrylate having a polyethyleneimine and an alkyl group having 8 to 18 carbon atoms, and (b) a monomer having a β-diketone group or a β-ketoacid ester group, and the ink (B) containing a nitrogen-containing graft copolymer having a polyester side chain, irrespective of the order of discharge of the inks.

Furthermore, the black density was especially improved by using carbon black as the first coloring material of the ink (A), and the black density was able to be further improved by using copper phthalocyanine as the second coloring material of the ink (B). Furthermore, it is understood from the comparison of Example 4 and Example 7 that the image density was further improved by setting the order of discharge to from the ink (A) (carbon black) to the ink (B) (copper phthalocyanine).

On the other hand, in the ink in which the combination of the dispersant and the coloring material was other than those mentioned above, i.e., the ink sets of Comparative Examples 1 to 5, any sufficient image density or brilliant color was not be able to be obtained.

What is claimed is:

1. An inkjet printing process comprising forming an image by superposing two or more different inks selected from an ink set, the ink set comprising:
    (A) an ink containing at least a first coloring material,
        a non-aqueous solvent,
        a non-aqueous resin, and
        a water-soluble resin having an amino group, and
    (B) an ink containing at least
        a second coloring material,
        a non-aqueous solvent, and
        a nitrogen-containing graft copolymer having a polyester side chain.

2. The inkjet printing process according to claim 1, wherein the image is a composite black image, and the first coloring material contains carbon black.

3. The inkjet printing process according to claim 1, wherein the second coloring material contains copper phthalocyanine.

4. The inkjet printing process according to claim 2, wherein the second coloring material contains copper phthalocyanine.

5. The inkjet printing process according to claim 1, wherein the image is a color image, and the first coloring material and the second coloring material contain coloring materials of chromatic colors.

6. The inkjet printing process according to claim 1, wherein the non-aqueous resin is an acrylic polymer formed of a copolymer of a monomer mixture containing (a) an alkyl(meth)acrylate having an alkyl group having 8 to 18 carbon atoms, and (b) a monomer having a β-diketone group or a β-ketoacid ester group.

7. The inkjet printing process according to claim 1, wherein the water-soluble resin is a polyethyleneimine.

8. The inkjet printing process according to claim 1, wherein the image is formed by superposing the ink (B) on the ink (A).

9. The inkjet printing process according to claim 2, wherein the image is formed by superposing the ink (B) on the ink (A).

10. The inkjet printing process according to claim 3, wherein the image is formed by superposing the ink (B) on the ink (A).

11. The inkjet printing process according to claim 4, wherein the image is formed by superposing the ink (B) on the ink (A).

12. The inkjet printing process according to claim 5, wherein the image is formed by superposing the ink (B) on the ink (A).

13. The inkjet printing process according to claim 6, wherein the image is formed by superposing the ink (B) on the ink (A).

14. The inkjet printing process according to claim 7, wherein the image is formed by superposing the ink (B) on the ink (A).

15. A non-aqueous ink set comprising
    (A) an ink containing at least
        a first coloring material,
        a non-aqueous solvent,
        a non-aqueous resin, and
        a water-soluble resin having an amino group, and
    (B) an ink containing at least
        a second coloring material,
        a non-aqueous solvent, and
        a nitrogen-containing graft copolymer having a polyester side chain.

* * * * *